(12) United States Patent
Vall et al.

(10) Patent No.: US 8,004,453 B1
(45) Date of Patent: Aug. 23, 2011

(54) ELEVATION NULL COMMAND GENERATOR FOR MONOPULSE RADAR AIRBORNE MISSILE GUIDANCE SYSTEMS

(75) Inventors: Andrew E. Vall, Torrance, CA (US); Frederick C. Williams, Topanga, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 05/298,674

(22) Filed: Oct. 16, 1972

(51) Int. Cl.
*G01S 13/00* (2006.01)

(52) U.S. Cl. ............................................. 342/62; 342/77

(58) Field of Classification Search .................. 343/7.4, 343/16 M; 342/62
See application file for complete search history.

(56) References Cited

U.S. PATENT DOCUMENTS

3,623,094 A * 11/1971 Paine et al. .................... 342/153
4,442,431 A * 4/1984 Bleakney .......................... 342/62
* cited by examiner

*Primary Examiner* — Thomas Tarcza
*Assistant Examiner* — Matthew M Barker
(74) *Attorney, Agent, or Firm* — Daly, Crowley, Mofford & Durkee, LLP (57) ABSTRACT

There is disclosed an elevation null command generator (ENCG) for use in airborne monopulse radar, and a novel missile guidance system made possible by use of the ENGC. The ENCG provides an accurate means of directing the elevation monopulse plane of a radar antenna at a patch of ground defined by a range signal generated within the radar or its associated equipment. It is shown that within the system range can define the elevation angle of concern. The ENCG includes a central range gate centered at the command range and a plurality of pairs of range gates, the two gates of each pair being time spaced before and after the central range gate, and has circuit means for normalizing the output of the range gates to eliminate the bias effects of strong targets adjacent to the monopulse null plane and ground surface intersection.

10 Claims, 7 Drawing Sheets

ELEVATION NULL COMMAND GENERATOR FOR MONOPULSE RADAR AIRBORNE MISSILE GUIDANCE SYSTEMS

BACKGROUND OF THE INVENTION

1. Field of the Invention

The present invention relates to an elevation null command generator suitable for use in equipment such as airborne monopulse radar, missile guidance systems, terrain avoidance radar systems, and the like, and to novel systems made possible by the use of the elevation null command generator. More particularly, the invention relates to an elevation null command generator (hereinafter ENCG) which provides an accurate means of directing the elevation monopulse null plane of a radar antenna at a patch of ground defined by a range signal generated within the radar or its associated equipment.

2. Description of the Prior Art

In terrain following-terrain avoidance radars the elevation monopulse null of the radar is stabilized by a device which consists of a single range gate generator and associated circuitry for averaging the output of the range gate to hold the mean signal in the elevation difference channel to zero or some other preset value. The accuracy of such systems is reduced by their susceptibility to bias effects of strong targets off the monopulse null but close enough to it to be within the range gate. Efforts to reduce this effect by narrowing the time width of the range gate result in decreasing the signal to noise ratio of the system, thereby again impairing accuracy. The device of the present invention is capable of giving results which are at least an order of magnitude improvement in the pointing accuracy of the ENCG as compared to such existing circuits.

3. Related Applications

The following copending patent applications, all of which are assigned to the same assignee as the present application, are illustrative of the type of system in which and of the associated equipment with which the elevation null command generator of this invention may be used. These applications and the references of record therein may also comprise additional prior art relevant to certain aspects of the present invention.

U.S. Pat. No. 736,932 filed on Jun. 5, 1968 in the name of William M. Bleakney entitled "Error Sensing Generator in a Monopulse Radar System" relates to an improved, airborne target tracking, monopulse radar system which includes an azimuth null command generator designed to provide an error signal which represents the angle between a command target direction and the antenna's actual monopulse azimuth null plane direction. The generator is supplied with radar return signals on sum and difference channels and with a frequency which represents a selected target in the sense that this frequency is equal to the doppler frequency shift for a target having a predetermined azimuth angular relationship to the direction of the vector velocity of the airborne system. The azimuth error signal in the disclosure is produced by first differentiating the sum channel signals and then subtracting the differentiated signals from the difference channel signal in a dual receiver. The difference output is then multiplied with properly phased sum channel signals to produce the desired error signal.

U.S. Pat. No. 666,542 filed on Aug. 29, 1967 in the name of F. C. Williams entitled "Monopulse Radar System" relates to an azimuth null command generator comprising a doppler frequency controlled beam pointing system for positioning the azimuth null plane of a monopulse antenna at a selected target. In this system a target azimuth position in the form of a doppler frequency signal is mixed with radar return signals in a sum and difference monopulse receiver. The output signals in the range gate controlled vicinity of a defined target are coupled to a processor where they are compared with the doppler frequency corresponding to the command azimuth of the selected target and where an error signal is derived which is indicative of the difference between the selected target azimuth position and the existing azimuth of the antenna monopulse null. The error signal is applied to an antenna drive servo which physically moves the antenna until the monopulse null is pointed at the selected target. The circuitry of the doppler beam pointer includes a center filter and a plurality of pairs of filters, the members of each pair of filters being equally spaced respectively above and below the center frequency at the monopulse null so that a cross product of received ground target signals may be derived by suitable multipliers to transform the energy contained in non-symmetrical backscatter to symmetrical form and thereby increase the accuracy of the null command generator. An azimuth null command generator of such a type wherein the output of a bank of filters is used to provide the factors for a cross product thus makes possible a tracking system usable in a monopulse doppler radar which operates independently of backscatter variations and which can therefore precisely track a weak ground target.

U.S. Pat. No. 163,535 filed Jul. 12, 1971 in the name of William M. Bleakney entitled "Airborne Missile Guidance System" relates to an airborne radar system with a monopulse antenna which system is also provided both with target area mapping means and with missile tracking and guidance means. The system receives return signals from a radar illuminated ground area including a target and in conjunction with a synthetic array data processor displays the illuminated area in terms of azimuth angle as measured by doppler frequency as one coordinate and in terms of range to the target as the other coordinate. Range and azimuth cursors are generated and displayed on the synthetic array map for target selection. These cursors represent controllable command values of range and doppler frequency. Manual means are provided to control the displayed cursors so that when the target is displayed under the cursors' intersection they indicate its doppler frequency and range. The command doppler frequency so derived is used to adjust the monopulse azimuth null plane of the antenna to point to the target. The missile guidance system disclosed in this application utilizes the fact that the locus of all points having the same azimuth angular deviation from the vector velocity of the airborne system, and hence the same doppler frequency shift, lies on a cone having its apex at the airborne system and having its axis of symmetry coinciding with the vector velocity of the system. Furthermore, the locus of all points having an equal range from the system at any given instant lies on a sphere centered at the system and having a radius equal to the specified range. The intersection of the iso-doppler cone and the iso-range sphere is a circle which will intersect the ground plane on which a target may be located at only two points. The coordinates of these points are given by azimuth angles having opposite signs and the same magnitude and by a range of the specified magnitude. The location of a target can thus be specified in terms of coordinates comprising a signed azimuth angle and a specified range. The cursors generate these values to indicate target location and the missile guidance system controls the missile to fly in the servo controlled azimuth monopulse null plane initially at a high horizontal elevation profile until the missile reaches the command range. At that time the missile is controlled to fly down the intersection of the azimuth null plane and the iso-range sphere so that it descends in a circular arc trajectory to a specified target. A system is thus provided which is capable of delivering a missile to a weakly reflecting target from an aircraft which flies at a safe standoff distance from the target. The side looking radar permits utilization of the missile trajectory described. This system may use the azimuth null command generators of either of the two previously mentioned applications, but it is intended for use purely against targets having a fixed position on the ground and does not contemplate servo controlled tracking of the antenna with respect to elevation. The possible trajectories are thus limited by the necessity of using the iso-range sphere for terminal missile guidance.

Systems of this type which use synthetic array radars for mapping to derive command signals have been referred to by the acronym SARCALM for Synthetic Array Radar Commanded Air Launched Missile.

SUMMARY OF THIS INVENTION

The present invention relates to an improved elevation null command generator suitable for use in controlling the elevation null plane of a monopulse radar system either of the type now used in terrain following radars or of the type used in the above discussed target tracking systems. The elevation null command generator, ENCG, of this invention is immune to the bias effects of strong targets off the monopulse null which affect the performance of prior art techniques such as the range gate averaging circuits discussed above. The ENCG will also handle a larger area of ground so that the error due to signal to noise ratio can be reduced. The net result of these advantages is at least an order of magnitude improvement in the elevation pointing accuracy as compared to prior art devices.

This improvement in accuracy is achieved by processing the sum and difference channel outputs of a dual channel receiver through a plurality of pairs of range gates spaced above and below a central range gate. The center of the central range gate is placed at the range of the target it is desired to track. The plurality of pairs of gates may then, for example, be equally time spaced above and below this value at increasing increments. These oppositely and equally spaced pairs of range gates are used to increase the amount of ground that can be utilized in the ENCG by cross multiplying the elevation monopulse sum signal at a range increment greater than the desired tracking range by the elevation monopulse difference signal at the same range increment less than the desired range. This quantity is then compared with another term similar to the above cross product with the inner and outer ranges of the sum and difference terms reversed. It will be shown in detail below that the sum of these two quantities is zero if the monopulse elevation null is directed at the command range and that this is true independently of variation in terrain backscatter. Such an elevation null command generator makes possible not only more accurate terrain following-terrain avoidance radars, but also when used in conjunction with the azimuth null command generators of the applications discussed above permits a determination of the intersection of the radar's azimuth null plane with its elevation null plane to define a boresight line to a particular target. By continuously servo controlling the antenna in both elevation and azimuth it is possible to track a selected fixed target while the airborne system itself is in motion and to guide a missile to such a target through a trajectory which, since it does not depend upon utilization of the iso-range sphere, may initially drop to a low altitude under enemy radar to avoid detection and countermeasures and then be delivered horizontally in the azimuth plane to the elevation plane intersection and then along the terminal portion of the above noted boresight line from the radar to the selected target.

BRIEF DESCRIPTION OF THE DRAWINGS

These and other objects, advantages and features of the invention will be more fully understood from the following detailed description when read in connection with the accompanying drawings wherein like reference characters refer to like parts throughout and in which.

DETAILED DESCRIPTION

Turning now to the drawings, the geometric relationships applicable to the present invention are diagrammatically illustrated in FIGS. 1 through 5. It will be seen that an aircraft 12 is assumed to be flying in a flight path 14 with a vector velocity indicated by the vector $\overline{V}$. The target 15 to which it is desired to guide a missile launched from aircraft 12 is located at the center of a patch or area of ground 15a which is in the ground plane 24 which in turn is assumed to be flat and horizontal for purposes of this illustration. The vertical plane 22 containing the flight path 14 is thus perpendicular to the ground plane 24. A horizontal plane 23 parallel to the ground plane 24 is also shown at the altitude H at which the aircraft 12 is flying. The straight line of sight from the radar system on the aircraft 12 to the target 15 is indicated as boresight line 20. The projection of line 20 on the ground plane 24 is indicated by the line G which is the horizontal distance to the target 15. Line G is perpendicular to the altitude H which is contained in the vertical plane 22. The lines G, H, and boresight line 20 are all in the azimuth plane 25 and form therein a right triangle of which the angle E between the side G and hypotenuse 20 is the elevation angle which it is desired to define for purposes of servo controlling the antenna of the sidelooking radar on aircraft 12. Angle E is, of course, numerically equal to the angle of depression of the line 20 from the horizontal plane 23 since these angles are formed on opposite sides of the straight line 20 which intersects parallel planes 23 and 24.

Figure 3:
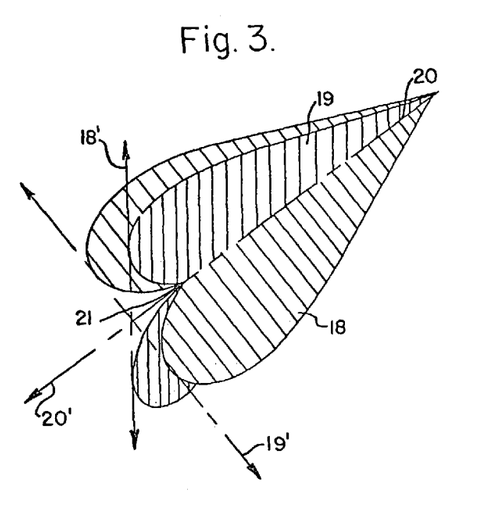
FIG. 3 is a perspective view illustrating the manner in which the intersection of the azimuth and elevation planes as defined by the null of the monopulse difference patterns defines the boresight line from the antenna to the target.
Figure 9:
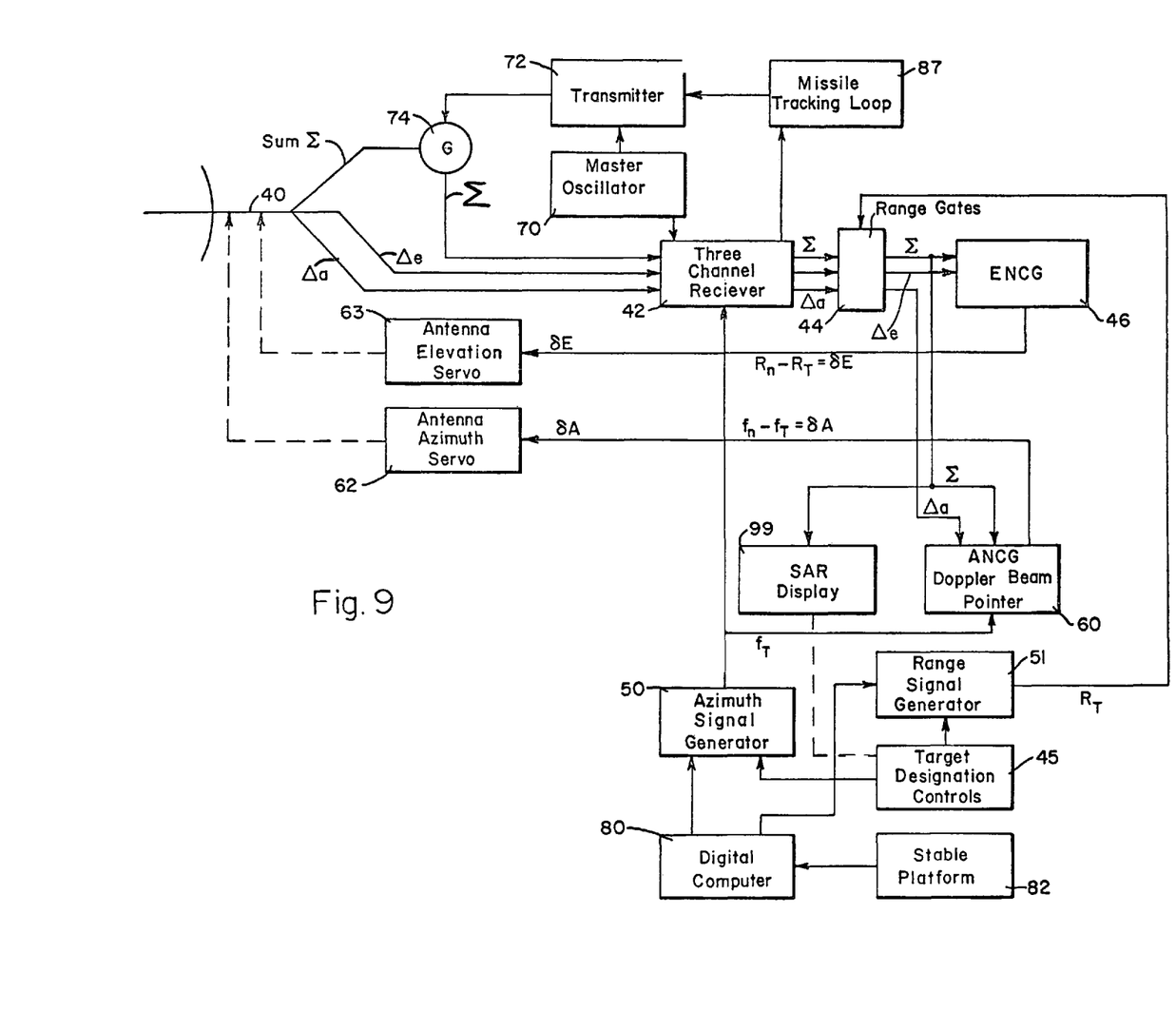
FIG. 9 is a block diagram of a radar missile guidance system using the elevation null command generator of the present invention.

The plane of the triangle formed by lines G, H, and boresight 20 is the azimuth plane 25 which is also perpendicular to the ground plane 24, but which forms the azimuth angle A with the vertical plane 22 in which the vector velocity $\overline{V}$ is contained. This azimuth angle A is the angle with respect to which the antennas of the radar systems discussed in the above noted related applications were servo controlled. It is assumed in the present case that the system being used may, as seen in FIG. 9, also have an azimuth null command generator (which is preferably of the type shown in U.S. Pat. No. 666,542) to position the radar antenna so that the null of the monopulse difference pattern 18 shown in FIG. 3 coincides with the boresight line of sight 20 from the aircraft to the target 15 to thereby define the azimuth angle A and hence the azimuth plane 25 which is by definition taken to be perpendicular to the horizontal ground plane 24. As seen in FIG. 3 the unit vector $\overline{18'}$ is perpendicular to the unit vector $\overline{20'}$ which lies on the line of sight 20 and which coincides with the null of the difference pattern 18. The unit vectors $\overline{18'}$ and $\overline{20'}$ lie in the azimuth plane 25.

Figure 1:
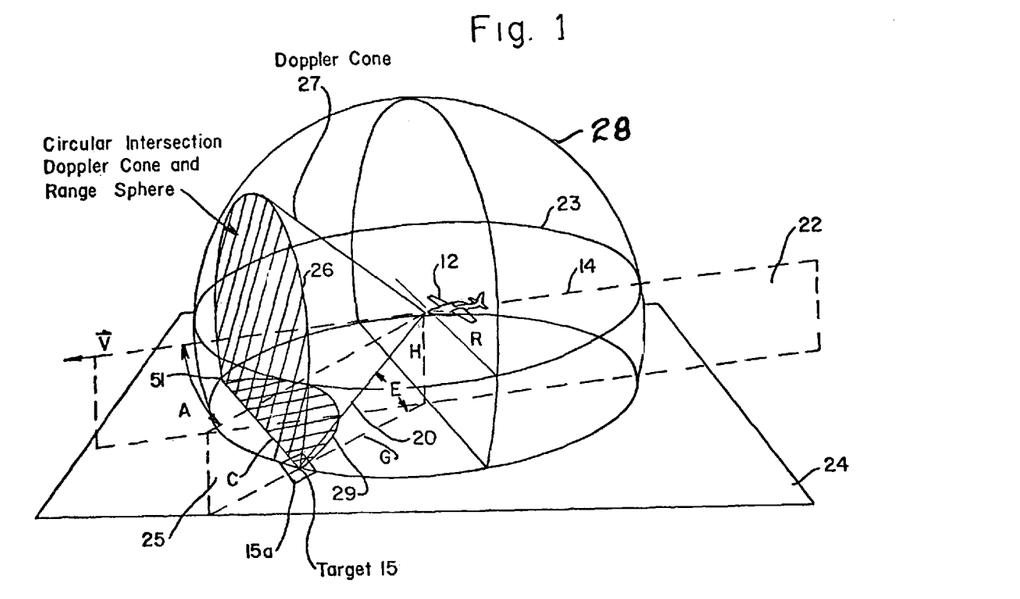
FIG. 1 is a three-dimensional diagrammatic view illustrating the geometry involved in target tracking by the system of the present invention.

As has been shown in the above referenced related applications, the locus of equal off-vector angle is the surface of a right circular cone indicated as the doppler cone 27 in FIG. 1. For fixed targets, the doppler frequency ($f_d$) is related to the magnitude of the velocity vector $|\overline{v}|=v_d$ by the following equation $$f_d = \frac{2v_d}{\lambda}\cos A \qquad (1)$$

where $\lambda$ is the wavelength of the radar energy.

It is thus seen that for fixed targets and for a constant speed, $V_d$, and at a constant wavelength of radiated energy, the doppler frequency shift, $f_d$, varies as a function of the cosine of the azimuth angle A. The magnitude of the doppler frequency shift is thus a measure of angle A and will be the same for all angles A having the same value provided the other variables remain fixed. As noted above, the locus of all angles' equal to the angle A will be seen by inspection to be defined by the doppler cone 27 in FIG. 1 which is a right circular cone having its apex at the aircraft 12 and its axis of symmetry along the flight path 14. On the other hand, the locus of all points which are at the same range or distance from the aircraft 12 is defined by the range sphere 28 as shown in FIG. 1. The range sphere 28, of course, intersects the horizontal plane 23 of the flight path 14 in a circle of radius R which is also the radius of the sphere. The intersection of the range sphere 28 with the ground plane 24, however, is a circle of radius less than R and equal to G, the ground distance from the vertical projection of the aircraft along the line H on the ground plane to the target 15. The intersection of the doppler cone 27 with the range sphere 28 is the circle 26 the plane of which is perpendicular to the ground plane 24. Circle 26 intersects the ground plane 24 at the location of the target 15 and at a point 51 which is the mirror image of point 15 on the opposite side of vertical flight path plane 22. The doppler cone 27 itself intersects the ground plane 24 in the hyperbolic arc 29 which extends between points 51 and 15. The cord, C, of this arc is the straight line joining points 15 and 51. The mirror image point does not create an ambiguity for azimuth angles which are large by comparison to the radar antenna's beamwidth since only one point is illuminated and the gross pointing direction of the antenna is known from gimbal instrumentation.

Figure 2:
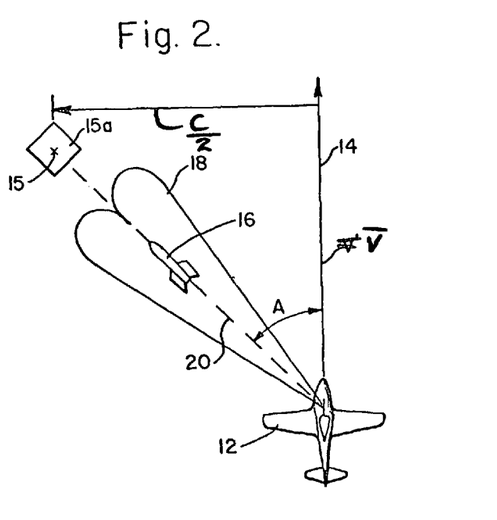
FIG. 2 is a plan view showing the relationship in the horizontal ground plane of the target and the projections thereon of the aircraft, its velocity vector, the boresight line, the azimuth antenna pattern and the azimuth angle.
Figure 8:
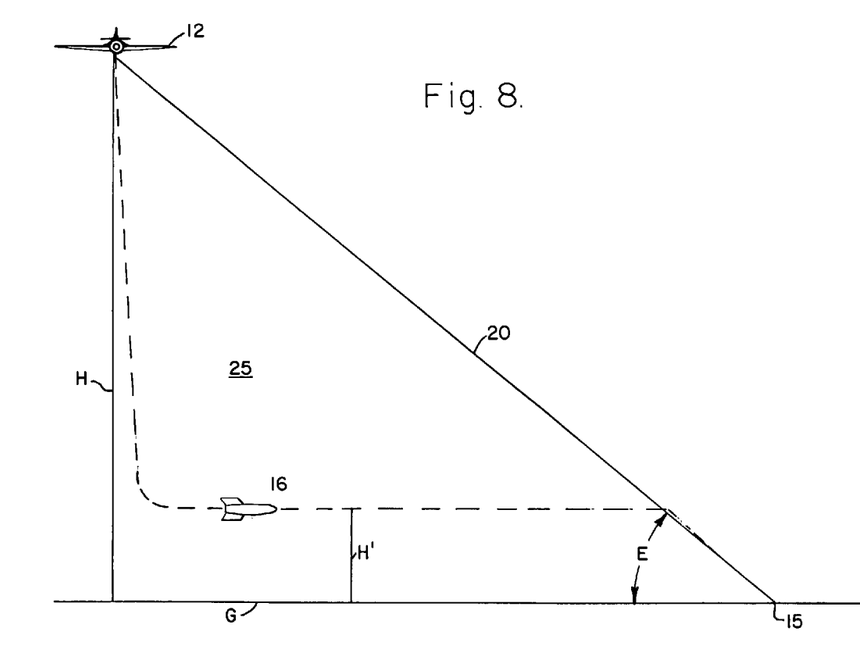
FIG. 8 is a diagrammatic elevation view taken in a plane orthogonal to the vector velocity of an aircraft on which the radar system is mounted and illustrating the trajectory in which it is possible and desirable to guide a missile to a target utilizing systems embodying the present invention.

As may more clearly be seen in FIG. 2, the cord C is bisected by the projection of the vertical flight path 14 on the ground plane so that the ground distance perpendicularly from the flight path plane 22 to target 15 is equal to ½ C. As noted above, it is desired to guide a missile 16 in the azimuth plane defined by the line 20 extending from the radar on aircraft 12 to the target 15 along the null of the difference pattern 18 of the monopulse radar. In the earlier filed above noted applications, the flight path of this missile was substantially in the horizontal plane 23 in its initial portion until the missile approached the range sphere 28 at which time it was guided down the intersection of the azimuth plane 25 and the range sphere 28 to the target 15. Such a trajectory does not require that the elevation angle of the target be known, but it does subject the missile to detection and countermeasures by enemy radar and requires extensive missile maneuvers which impose a short range limit to the system. With the invention of the present application it is possible to guide the missile 16 along the flight path shown in FIG. 8 which still keeps it within the azimuth plane 25 at all times, but in which the missile first descends to a low altitude H' and then is guided along the terminal portion of boresight line 20 itself after intersection therewith.

The boresight line 20 is electronically defined by the intersection of the azimuth and elevation null planes as illustrated in detail in FIG. 3. The axis of symmetry passing through the null point of the azimuth difference pattern 18 defines the direction of the azimuth plane with respect to the velocity vector $\overline{V}$. The unit vectors $\overline{20'}$, lying along boresight line 20, and $\overline{18'}$, perpendicular to it and to the plane of the difference pattern 18, lie in and further define the position of the azimuth plane 25 which, by definition, is taken as being perpendicular to the ground plane 24 and in a direction such as to pass through target 15. The null point 21 of elevation difference pattern 19 is common with the null point of the azimuth difference pattern and lies in the elevation plane which is defined by the unit vectors $\overline{20'}$ and $\overline{19'}$ which form a mutually orthogonal set with unit vector $\overline{18'}$. When the boresight line 20 is nulled on to the selected target 15, the intersection of the elevation plane thus defined with the ground plane 24 passes through target 15 in a straight line indicated as $R_o$ in FIG. 4.

Figure 4:
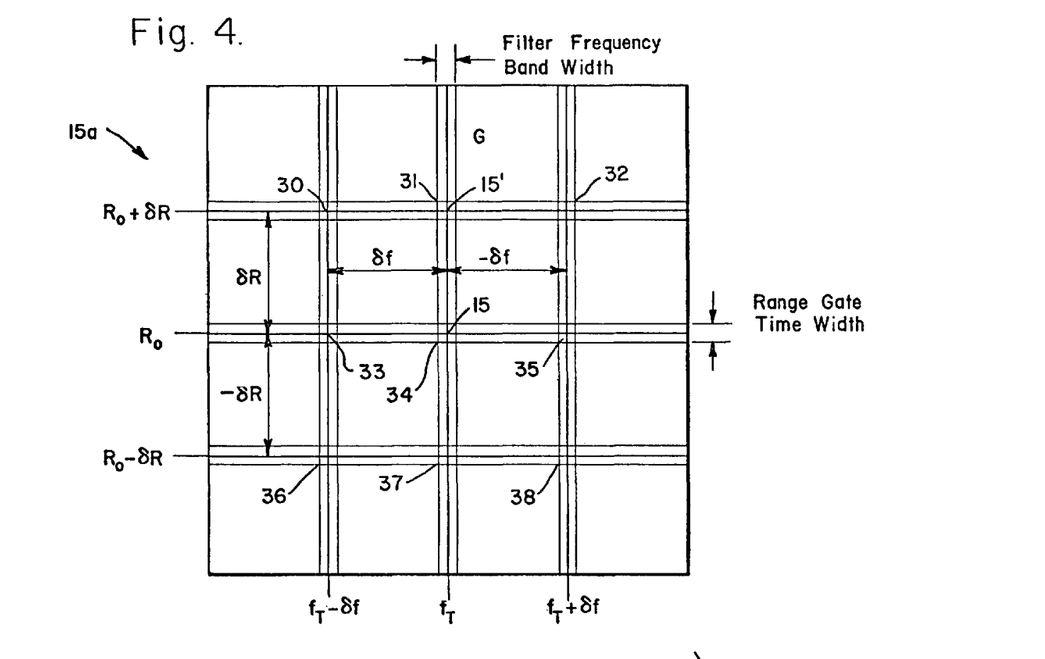
FIG. 4 is a diagrammatic plan view of a patch of ground surrounding a target.

FIG. 4 shows not only this intersection line $R_o$, but also the area or patch of ground 15a surrounding target 15. The angle between the line G and the boresight line 20 (which intersect at the line $R_o$) as measured in the azimuth plane 25 is the elevation angle E discussed herein. The line $R_o$, of course, is in the ground plane and parallel to the unit vector $\overline{19'}$.

Figure 5:
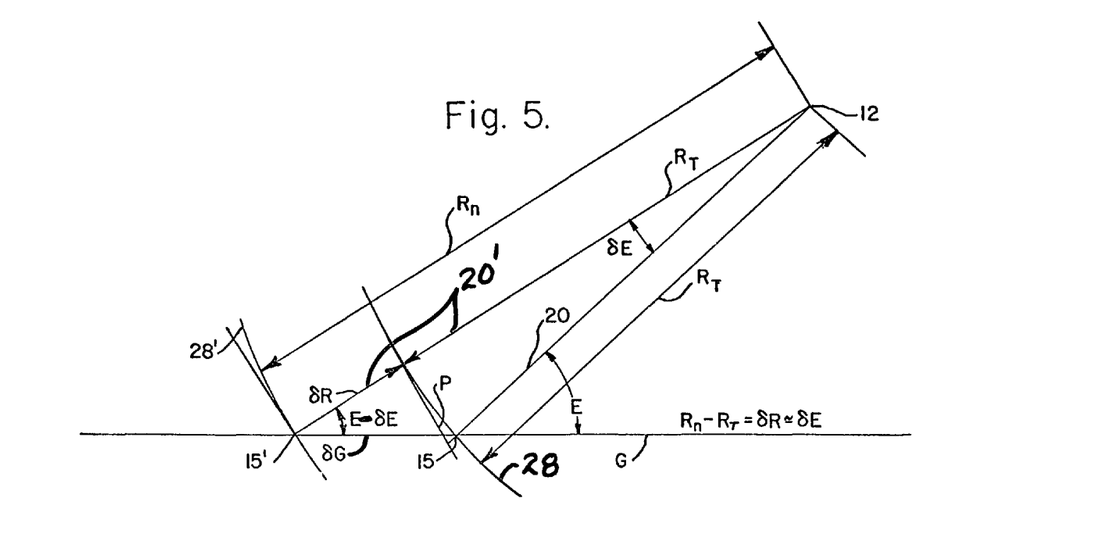
FIG. 5 is a diagram illustrating the mathematical approximations involved in the systems' operation whereby for small angles a change in range is taken as an approximation of the change in elevation angle.

In FIG. 5 there is shown a detailed view taken in the azimuth plane 25 and showing the intersection of the boresight line 20 and the ground distance line G at the target 15. This intersection defines the actual elevation angle E of the target. In order to illustrate the small angle approximations on which the operation of the ENCG is predicated, the actual length of the boresight line from the aircraft radar 12 to target 15 is indicated as $R_T$ and there is also illustrated the electronically defined position of the line 20' defined by the intersection of the azimuth and elevation null planes for the case where that intersection line passes through a point 15' which is located on the line G at a distance δG beyond the desired command target 15. The intersection of an arc of range sphere 28 passing through target 15 divides line 20' into two segments. The segment $R_T$ is equal to the distance $R_T$ along line 20 since they are both radii of the same sphere. The second segment δR is the extension of $R_T$ to point 15' which is defined by the intersection of the range sphere 28' with the ground plane, where 28' has a radius of $R_T$ plus δR. The angle δE between the line 20 and 20' is assumed to be a small angle by which the actual boresight 20' of the antenna patterns differs from the line of sight 20 from the aircraft's antenna to the target 15. For purposes of analysis, a line segment P is constructed which is perpendicular to the line 20' and tangent to the arc 28 at the point of intersection of 28 and 20'.

It is then true by definition of the target and from the fact that for small arcs 28 the exterior chord is nearly equal to the interior chord, that:

$$\tan \delta E \cong \frac{P}{R_T} \quad (2)$$

For small angles, however, the tangent of the angle is approximately equal to the angle so that we may write $$P \cong R_T \times \delta E. \quad (3)$$

From the triangle having sides δR, δG, and P, however, we note that the angle E−δE included between the sides δR and δG is defined by the following.

$$\tan(E - \delta E) = \frac{P}{\delta R} \cong \frac{R_T \delta E}{\delta R} \quad (4)$$

The above equation is found by simple substitution from the previous relationship and may be simplified to read:

$$\delta E \cong \frac{\tan(E - \delta E)}{R_T} \delta R \quad (5)$$

From equation (5), it will be seen that for small angular errors the error in the elevation angle δE is approximately equal to the error in range δR times a factor which is a constant for any given elevation angle E. For example, in a normal operating range where (E−δE)=45°, the tangent of (E−δE) is equal to 1 and the distance $R_T$ is very large by comparison to all other quantities. The small angle assumption that the elevation angle δE is approximately proportional to the error in range δR for small values thereof is thus justified for angles less than 90° such as are used in sidelooking radar systems.

Having made this approximation assumption, the ENCG of this invention then operates in the range domain in a manner analogous to the operation in the frequency domain of the azimuth null command generator (ANCG) of U.S. Pat. No. 666,542 discussed above. This may be more clearly seen from a consideration of FIG. 4 wherein the area 15a surrounding the target 15 is shown in plan view. The line G passes through the actual target 15 in an azimuth direction defined by the frequency $f_T$ representing the doppler shift frequency for the angle A. Centered about the frequency $f_T$ is a band pass filter the bandwidth of which is indicated by the lines parallel to and adjacent to $f_T$. Spaced to the left and right of $f_T$ or below and above it in frequency by equal amounts of δf is a first pair of band pass filters used for the cross multiplication explained in the earlier application describing the ANCG.

That is to say, in the ANCG which used a single range gate centered at a distance $R_T$ defining the line $R_o$, the portions of the signal return amplitudes within that gate and also within the pair of filters were integrated and cross-multiplied. Thus, the area 33 representing the intersection of the filter centered at $f_o$−δf with range gate $R_o$ was made and is cross multiplied with the similar intersection 35 formed by the filter $f_o$+δf and the range gate $R_o$ in order to obtain an azimuth null signal.

The ENCG described herein operates in the range domain in a similar manner. In the case of the ANCG, cross multiplication of sum and difference azimuth monopulse returns from "opposite" frequencies at the same range is used. In the present ENCG, cross multiplication of sum and difference elevation monopulse returns from the same frequency at "opposite" ranges is used. Here, the term "opposite" is defined relative to the range or frequency given by the command signals defining the position of the target 15. That is to say, for a range greater than the command range, $R_T$, by an amount δR, the "opposite" range is at a distance δR less than $R_T$. These opposite distances are shown diagrammatically in the plan view of FIG. 4 and are implemented in the ENCG by range gates positioned in time after and before the range gate for $R_o$ by proportional amounts. In like manner, "opposite" frequencies are defined at±δf around the target frequency $f_T$. This relationship between "opposite" ranges and frequencies is graphically illustrated in the plan view of FIG. 4.

In one embodiment to be described below the ENCG is implemented with a single narrow bandpass filter centered at the command target frequency $f_T$ with one or more pairs of range gates centered about the central range gate whose center line $R_o$ is at the range $R_T$. Only one such pair of range gates at $R_o$+δR and $R_o$−δOR are shown in FIG. 4. This pair defines the intersections 31 and 37 with the filter $f_T$ and the signal return from these intersections is cross multiplied in the single filter embodiment shown in the block diagram of FIG. 10.

In order to reduce the effects of cross line of sight ground slope in a manner to be discussed below, a second embodiment of the ENCG shown in FIG. 11 uses not only one or more pairs of range gates, but also one or more pairs of filters such as the pair of filters $f_T$−δf and $f_t$+δf. In this embodiment not only are the intersections 31 and 37 cross multiplied, but also the diagonally located intersections 30 and 38 are cross multiplied as are the opposite diagonal intersections 32 and 36. It will, of course, be understood that any desired number of pairs of filters and corresponding pairs of range gates may be used. Similarly, in the ANCG a plurality of pairs of range gates may be used with the plurality of pairs of filters rather than the single central range gate contemplated in the discussion above.

FIGS. 2 and 4 show the typical ENCG geometry where the aircraft radar is sidelooking to illuminate a patch of level ground whose center is defined by $R_o$ and $f_T$ in range and azimuth frequency respectively. The approximation relationships for level ground have been discussed in connection with FIG. 5. Where, as is often the case, the patch of ground surrounding the target 15 at $R_0$ and $f_T$ is flat but sloping upward and away from the aircraft, the effect is merely to change the constant of proportionality as will be seen if we consider the line G in FIG. 5 to be moved so that it slopes from its illustrated position so as to increase angle E.

Figure 7:
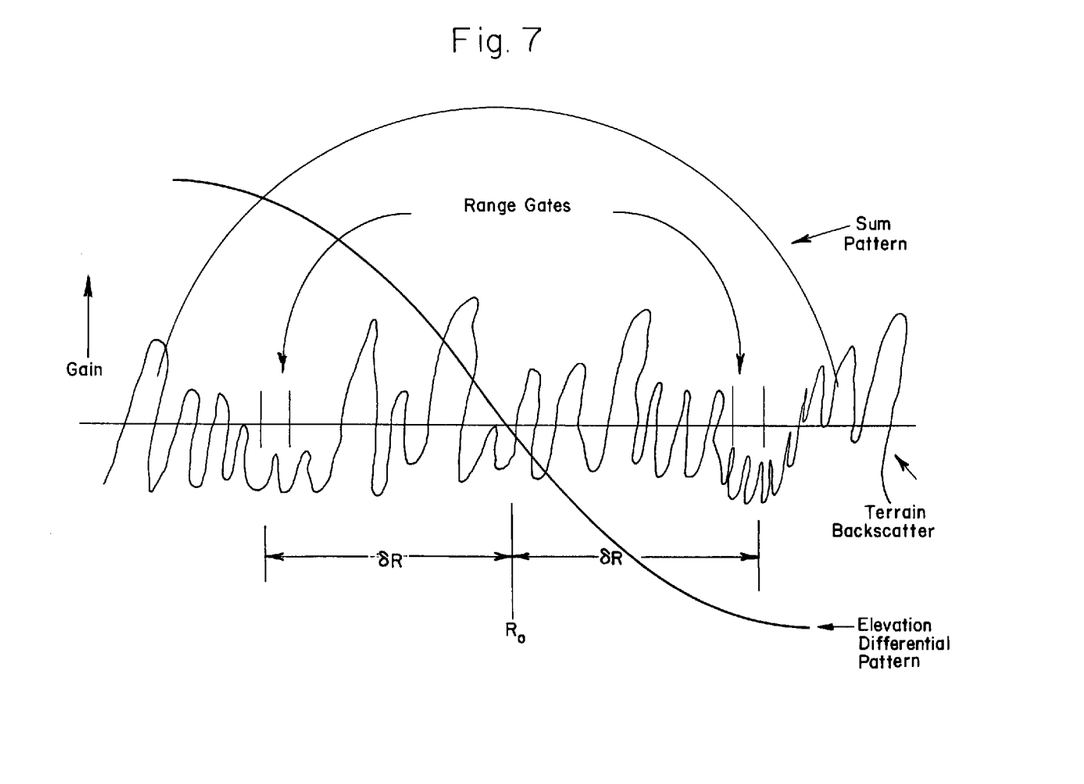
FIG. 7 is a graph of typical output signal from terrain backscatter using values of range about a central command range value as the abscissa with signal amplitude as the ordinate.

Considering for the moment such level or flat upwardly sloping ground and the center filter at $f_T$ only, we observe from the graph of FIG. 7 (which is a plot of the signal return amplitude or antenna gain as ordinate as a function of range which is plotted as abscissa) that the cross multiplication center finding technique works as well in range for the ENCG as it does in azimuth for the ANCG. That is, the estimate at the center provided by cross mulitiplying the sum and difference returns at±δR is independent of the random terrain backscattering level shown in the graph of FIG. 7. That this is true may be seen as follows recalling that for a fixed value of E, δR is proportional to δG.

Let the sum return at range $R_o+\delta R$ and frequency $f_T$ be $\eta(\delta R)$, $\Sigma(\delta R)$ and the corresponding difference return be $\eta(\delta R)\Delta(\delta R)$, where $\eta(\delta R)$ is the backscattering coefficient as a function of range δR and Σ and Δ are the sum and elevation difference gains respectively. The cross product (Pr) formed in the ENCG is then:

$$Pr. = \eta(\delta R)\ \Sigma(\delta R)\ \eta(-\delta R)\ \Delta(-\delta R) + \eta(-\delta R)\ \Sigma(-\delta R)\ \eta(\delta R)\ \Delta(\delta R), \quad (6)$$

$$= \eta(\delta R)\ \eta(-\delta R)\ [\Sigma(\delta R)\ \Delta(-\delta R) + \Sigma(-\delta R)\ \Delta(\delta R)]. \quad (7)$$

Since $\Sigma(\delta R)=\Sigma(-\delta R)$ and $\Delta(\delta R)=-\Delta(-\delta R)$, $$Pr.=0, \quad (8)$$

if, and only if, the elevation monopulse null is directed at gate $R_o$=range $R_T$ independent of the values of η.

This relationship will hold true of each of the individual filters diagrammatically represented in FIG. 4. In particular, if only a single filter is used at the azimuth frequency $f_T$ then the patches 31 and 37 and similar patches defined by other pairs of range gates are cross multiplied and summed. Alternatively, the ENCG may be mechanized with multiple filters to reduce the possible error induced by the effect of cross-line-of-sight ground slope. In such an embodiment the line connecting the two range gated filter points being cross multiplied always passes through the center point of the patch in order to cancel this effect out for cross-line-of-sight sloping but flat ground. That is to say, in FIG. 4 the patch 30 is cross multiplied with the patch 38 and the patch 32 is cross multiplied with the patch 36 as are similar patches analogously defined. This cross-line-of sight ground slope mechanization is only necessary when a multiple filter mechanization of the ENCG is employed. A single filter can be made narrow enough to eliminate the effect.

From the above it is clear that a SARCALM-like operation of the type discussed in U.S. Pat. No. 666,542 can be obtained for a multiple filter ENCG on flat (not necessarily level) ground. This operation will also hold for any terrain where the surface exhibits skew symmetry around the target point, i.e., where the surface can be expanded in a Taylor's series containing odd powers only. If the surface has true symmetry, i.e., contains even powers, a bias error will be introduced as can be seen from FIGS. 6, 12a, and 12b. The effect of such even powers can be approximated by determining the radius of curvature which will introduce the given elevation error. This holds in either the range or azimuth domain.

Figure 12A:
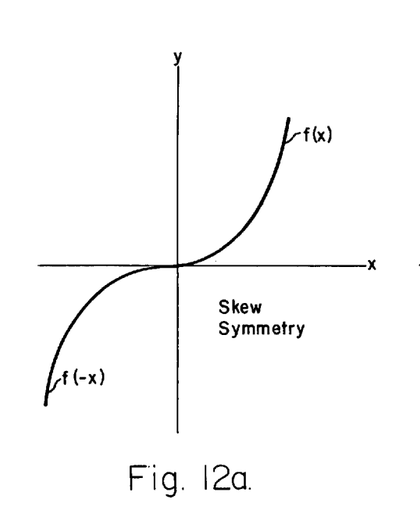
FIGS. 12a and 12b are theoretical graphs of relationship involved in the operation of the system.
Figure 12B:
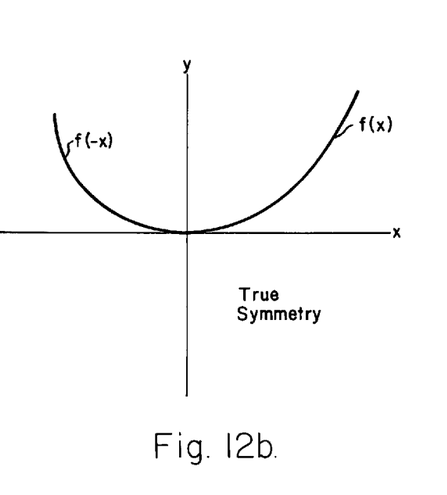

The concepts of skew symmetry as distinguished from true symmetry are respectively illustrated in the graphs of FIGS. 12a and 12b which have their origins at the target point and plot distance along the line $R_0$ on the X axis and the corresponding surface height deviation from the horizontal ground plane along the y axis on a function of x.

The average surface deviation in both FIGS. 12a and 12b is ½[f(x)+f(-x)]. In the skew symmetry case of FIG. 12a, this expression has a zero value for any absolute value of x since f(-x) is a negative mirror image of f(x), hence ½

$$\int_{-x}^{x} y = 0$$

for all values of x. In the true symmetry care of FIG. 12b values of y are positive for both f(x) and f(-x), hence the integral will have some finite value representing a bias error.

Figure 6:
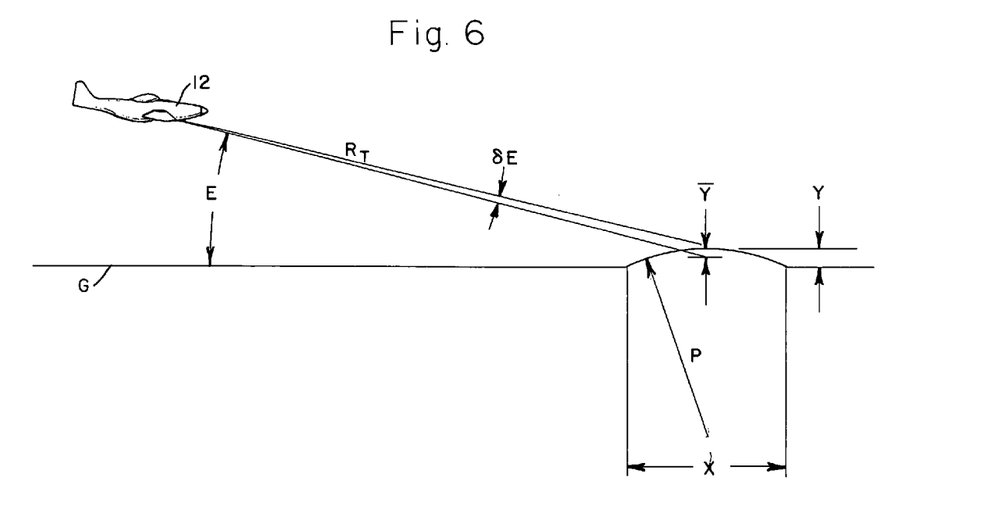
FIG. 6 is a diagramatic elevation view illustrating the geometrical considerations which define the error limits of the system due to terrain curvature.

In FIG. 6, an aircraft is attempting to determine the elevation of the top of a hill. The ENCG examines a patch of width×assumed to be a portion of a sphere of radius ρ. The actual elevation measured by the ENCG is the mean elevation of the patch. This is depressed $\overline{Y} \cong X^2/16\rho$ below the true elevation of the top of the hill. This introduces an angular error $\delta E = \overline{Y}/R_T$ where $R_T$ is the aircraft-target area range. By way of example, using an antenna or radiating element of the type used in the Phoenix Missile and a transmitter-receiver of the type disclosed above in connection with the SARCALM application, it has been found that for X=200 foot at a range $R_T$=10 nautical miles and radius of curvature of curvature ρ=800 ft. will introduce a 50 microradian error into the system. This is equal to the error due to the signal to noise ratio inherent in the system.

For a cylindrical rather than a spherical surface $\overline{Y} \cong X^2/24\rho$. This gives a value of ρ=500 feet as the radius of curvature which will produce the same 50 microradian angular error as is due to signal to noise ratio. This degree of surface curvature thus represents the maximum terrain irregularity with which the system can be used before such terrain irregularity begins to introduce detectable error.

Attention is now directed to FIG. 9 which is a block diagram of the equipment carried by aircraft 12. This equipment includes a master oscillator 70 which drives a transmitter 72. Its output is supplied to antenna 40 through a circulator 74 to illuminate the ground including target 15 as well as to supply coded missile steering commands to a missile, such as missile 16, once the latter is launched. The missile tracking and steering function is represented by block 87 in FIG. 9 since it is carried out in a conventional manner using techniques entirely analogous to those disclosed in the above noted Bleakney U.S. Pat. No. 163,535. As may be seen by reference to FIG. 8, once the missile 16 is launched along the trajectory indicated by the dash line therein, it is permitted to essentially free fall in the azimuth plane 25 until it is at a measured range the vertical component of which is less than the aircraft's altitude H by the desired horizontal altitude H'. The missile is then commanded to turn so as to proceed in the azimuth plane 25 on a line parallel to the ground plane until that line intersects the line of sight 20' defined by the intersection 20' of the null planes of the elevation and azimuth difference patterns. At that point the missile is then controlled in both azimuth and elevation to fly down the terminal portion of the intersection line 20 to target 15. The details of missile tracking and command equipment per se are conventional in the art and do not form a part of the present invention.

Considering again FIG. 9, it will be noted that radar returns from the illuminated ground including the target 15 are received by the antenna 40. The sum (Σ) pattern is sent to a three channel receiver 42 through circulator 74 and the azimuth and elevation difference patterns (Δa and Δe) are directly supplied to receiver 42. All three signals, Σ, Δa and Δe proceed thence to range gates 44.

There is also supplied to receiver 42 the signal $f_T$ which is derived from an azimuth cursor generator 50. The range gates 44 are controlled by the signal $R_T$ which is derived from the range cursor generator 51. The cursor generators 50 and 51 receive inputs from target designation controls 45 and from a digital computer 80 which in turn receives input information from the stable platform or inertial system 82. The controls 45 may, for example, be referenced to imagery displayed on a synthetic array radar display (99) of the type disclosed in detail in the above noted Bleakney U.S. Pat. No. 163,535 in which manual cursor controls are operated by an observer who selects a target from the map display by setting cursors thereon. The signals generated are then corrected for the motion of the aircraft 12 by the digital computer 80 and stable platform 82.

The signal $R_T$ is supplied to range gates 44 and defines the center $R_o$ of the central range gate as described above in connection with FIG. 4. The azimuth signal $f_T$ derived from the azimuth cursor generator 50 is supplied to the azimuth null command generator 60 which, as previously noted, is preferably of the type disclosed in the earlier referenced U.S. Pat. No. 666,542 of F. C. Williams. Azimuth null command generator 60 functions exactly as described in that application to serve as a doppler beam pointer for positioning the antenna in azimuth in such a fashion that the actual frequency, $f_n$, of the monopulse azimuth null plane of antenna 40 is equal to the frequency commanded by $f_T$.

The output δA of the azimuth null command generator 60 is the difference between the actual frequency of the azimuth null plane and the command or target frequency. This error signal δA is supplied as an input to the antenna azimuth servo 62 which in turn positions the antenna in the azimuth plane 25 so as to reduce this error signal δA to 0.

As was noted above, coherent RF energy from transmitter 72 is supplied through circulator 74 and through the sum pattern of the elevation monopulse antenna 40 shown in FIG. 9. Echoes are received in the antenna in the sum and azimuth and elevation monopulse difference channels and are amplified in the three channel receiver 42.

The sum and both difference outputs of three channel receiver 42 are passed through a plurality of range gates produced by range gate generator 44 and positioned in time in the mariner discussed above in connection with FIG. 4 with the central range gate having its center $R_o$ positioned by the signal $R_T$ derived from cursor generator 51. The sum and elevation difference channel outputs from the range gates are supplied as inputs to the elevation null command generator 46.

The range at which the ENCG 46 operates is determined by the signal $R_T$ from range cursor generator 51. In addition, the doppler frequency of the input sum and difference signal to the ENCG 46 must be reduced to a constant frequency (preferably 0 for the digital mechanization contemplated herein). To this end, the azimuth command signal, $f_T$, is supplied to the dual channel receiver 42 to off-set the received video signals by the doppler frequency of the target area. Both the azimuth and range cursor generators are corrected for aircraft motion by the combination of the digital computer and stable platform.

The output of the ENCG 46 is proportional to the angle θE representing the difference between the actual elevation of the monopulse null, $E_n$, of the antenna and the elevation angle $E_T$ of the designated target at range $R_T$. This error signal δE is supplied to the antenna servo 63 which in turn drives the antenna so as to reduce-this pointing error to zero.

Figure 10:
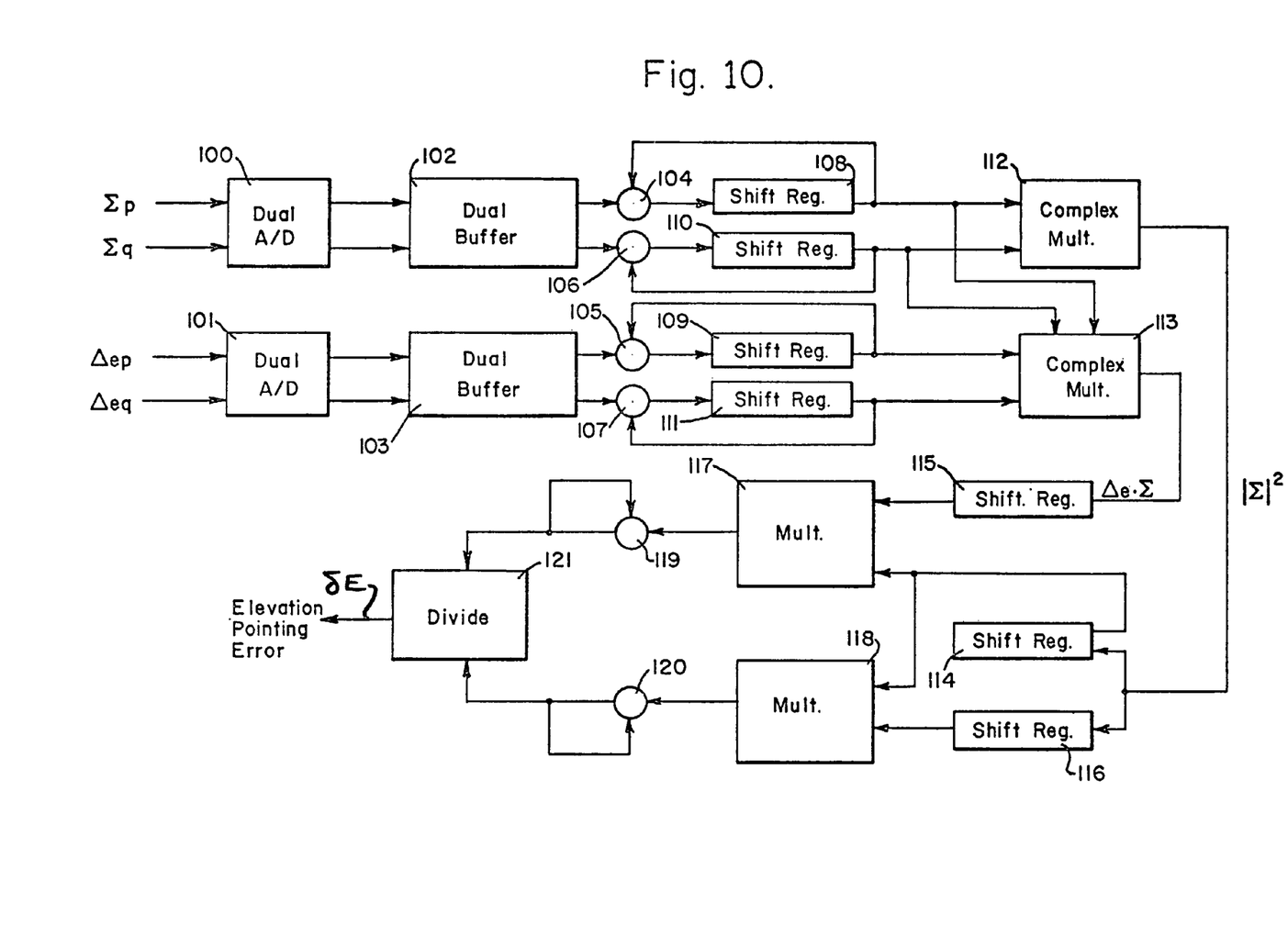
FIG. 10 is a block diagram showing in greater detail the configuration of the elevation null command generator for processing data received from a single azimuth defining frequency.

FIG. 10 shows a detailed digital mechanization for a single filter ENCG 46 in accordance with the present invention.

Here, elevation monopulse sum (Σ) and difference ($Δ_e$) video signals from the range gates of generator 44 are applied to a pair of dual analog to digital 6-bit converters 100 and 101 respectively. Both the sum and difference video signals are provided at zero off-set frequency in both in-phase (p) and quadrature (q) components. That is, four signals are presented: Σp, Σq, Δep and Δeq. Six bits will provide a dynamic range of almost 40 decibals which is sufficient for elevation monopulse null steering. The input sample timing is provided by the range gate generator 44 of the system of FIG. 9 which in turn receives target range command signals from generator 51. The output $R_T$ of generator 51 defines the center of the central range gate and the range gate generator of block 44 produces an ensemble of sampling pulses equally spaced ahead of and behind this target range as discussed above in connection with FIG. 4.

The digital numbers corresponding to in-phase and quadrature sum and elevation difference amplitudes at the sampling intervals defined by the range gate generator are fed to a pair of dual pulse repetition frequency buffers 102 and 103 respectively. These buffers accept data at the sampling rate and read the data out at a uniform rate during the radar interpulse period. This serves to reduce the signal bandwidth from, for example, 30 MHz corresponding to a 15-foot sampling interval to 22.5 KHz for a system having 16 range gates and a 1.6 KHz pulse repetition frequency.

A zero frequency filter consists of an accumulator which adds a sufficient number of PRF returns to obtain the desired filter bandwidth in azimuth. For example, for a 25 Hz filter bandwidth, (corresponding to a 200-foot filter width at 375 feet per second aircraft speed and 10 nautical mile range at X-Band) it would be necessary to accumulate 64 PRF inputs for the above 1.6 KHz PRF. Since the accumulations must be carried out separately for each range gate, a shift register following an adder stores the 16 range returns to be operated on. For the p and q components of the sum and difference channels this is shown as shift registers 108, 110, 109 and 111 respectively following adders 104, 106, 105 and 107. The feedback line from the output of each shift register to its associated input adder is provided to implement the accumulator function. This accumulation function permits utilization of the dead time during each radar cycle to substantially reduce the bandwidth requirements to be placed on the following portions of the system.

After the above 64 PRF returns have been accumulated, the output sum and difference signals go to the two complex multipliers 112 and 113 in the manner shown in FIG. 10. That is to say, the p and q components of the sum signal are applied from shift registers 108 and 110 respectively to complex multiplier 112 and also to complex multiplier 113. The p and q components of the difference signal are applied from shift registers 109 and 111 respectively as a second pair of inputs to complex multiplier 113. The complex multiplier 112 generates the absolute square of the sum signals by forming the quantity $|Σ|^2 = Σp^2 + Σq^2$. The complex multiplier 113 generates the scaler product of the difference signal and the corresponding sum signal $Δ_eΣ = Σ_pΔep + ΣqΔeq$. Since the sum and difference signals from an antenna are mutually perpendicular, the cross product terms $Σ_pΔeq + ΣqΔep = 0$.

The two real outputs from the complex multipliers 112 and 113 respectively are fed to a second set of shift registers which hold the 16 signals corresponding to the 16 range gates. Thus, multiplier 113 supplies its output $Δ_eΣ$ to shift register 115. Multiplier 112 supplies its output $|Σ|^2$ in parallel to shift registers 114 and 116 in order to crossmultiply "opposite" ranges as defined above.

This cross multiplication, which is a digital mechanization of equations 6, 7, and 8 above, is accomplished by feeding the output from shift register 114 in the sum channel to multiplier 117 in the difference channel. Multiplier 117 also receives the output from shift register 115 which had received the difference channel output from multiplier 113. In the shift registers 114, 115, and 116 which function as buffers, the shortest range will appear on their left hand side whereas the longest range will appear on their right hand side. Hence, as the two buffers 114 and 115 are read out in parallel into the multiplier 117 from the opposite sides of registers 114 and 115 as shown, the signals corresponding to the longest and shortest ranges are cross multiplied for each pair of "opposite" range gate selected signals. All of the cross multiplied signals are accumulated in the two accumulators 119 and 120 respectively following multiplier 117 and 118 in FIG. 10 so that the system will be immune to biasing effects of strong targets "opposite" to a weaker target as indicated in the deviation of equations 6, 7 and 8 above. After the terms have been accumulated the ratio of the accumulated totals is taken by divider 121 to divide out the effects of mean target signal strength. That is to say, the output of multiplier 118 which is accumulated at 120 is the squared signal in the sum channel and is essentially used as a normalizing factor so that the sensitivity of the system will be independent of the absolute value of signal return which may vary substantially from one target area to another. The output of divider 121 is then the signa δE which, as shown in FIG. 9, is applied to the antenna servo 63 to position the elevation null plane of the antenna 40 at the elevation commanded by the signal $R_T$ from generator 51.

The exact operation of FIG. 10 may be seen as follows. Let the terrain be a random function having values $\eta_i$, i=−N to N at 2N+1 range samples spaced δR apart. In the neighborhood of the monopulse null, let the sum pattern gain be approximately constant (Σo) and let the elevation difference pattern gain be approximately linear (k i δR) where k is the slope of the difference pattern. The received signals at the $i^{th}$ range gate are $\Sigma_i = \eta_i \Sigma_o$ and $\Delta_i = \eta_i k_i \delta R$ Suppose the antenna is pointed so that the monopulse null is at i=j≠0. The ENCG should develop signal proportional to j so as to repoint the antenna to i=o. In this case, the difference signal is proportional to $\Delta_1 = \rho_1 (i−j)k \delta R$. The output of multiplier 113 is $\eta_i^2 (i+j)k \Sigma_o \delta R$ and of multiplier 112 is $\eta_1^2 \Sigma_o^2$.

The output of adder 119 is:

$$\sum_{i=-N}^{N} n_1^2 n_{-i}^2 \sum_{O}^{3} k(-i+j) = \sum_{O}^{3} k\left[-\sum_{i=-N}^{N} n_1^2 n_{-i}^2 i + j \sum_{i=-N}^{N} n_1^2 n_{-i}^2\right] =$$

$$\sum_{O}^{3} k \sum_{i=0}^{N} n_i^2 n_{-i}^2 (i-i) + \sum_{O}^{3} kj \sum_{i=-N}^{N} n_1^2 n_{-i}^2$$

The first summation is identically zero so that:

$$\sum_{i=-N}^{N} n_1^2 n_{-i}^2 \sum_{O}^{3} k(-i+j) = \sum_{O}^{3} kj \sum_{i=-N}^{N} n_1^2 n_{-i}^2$$

The output of adder 120 is:

$$\sum_{O}^{4} \sum_{i=-N}^{N} n_1^2 n_{-i}^2$$

and the output of divider 121 is the desired quantity kj/$\Sigma_o$, proportional to j and the constants k and $\Sigma_o$.

Figure 11:
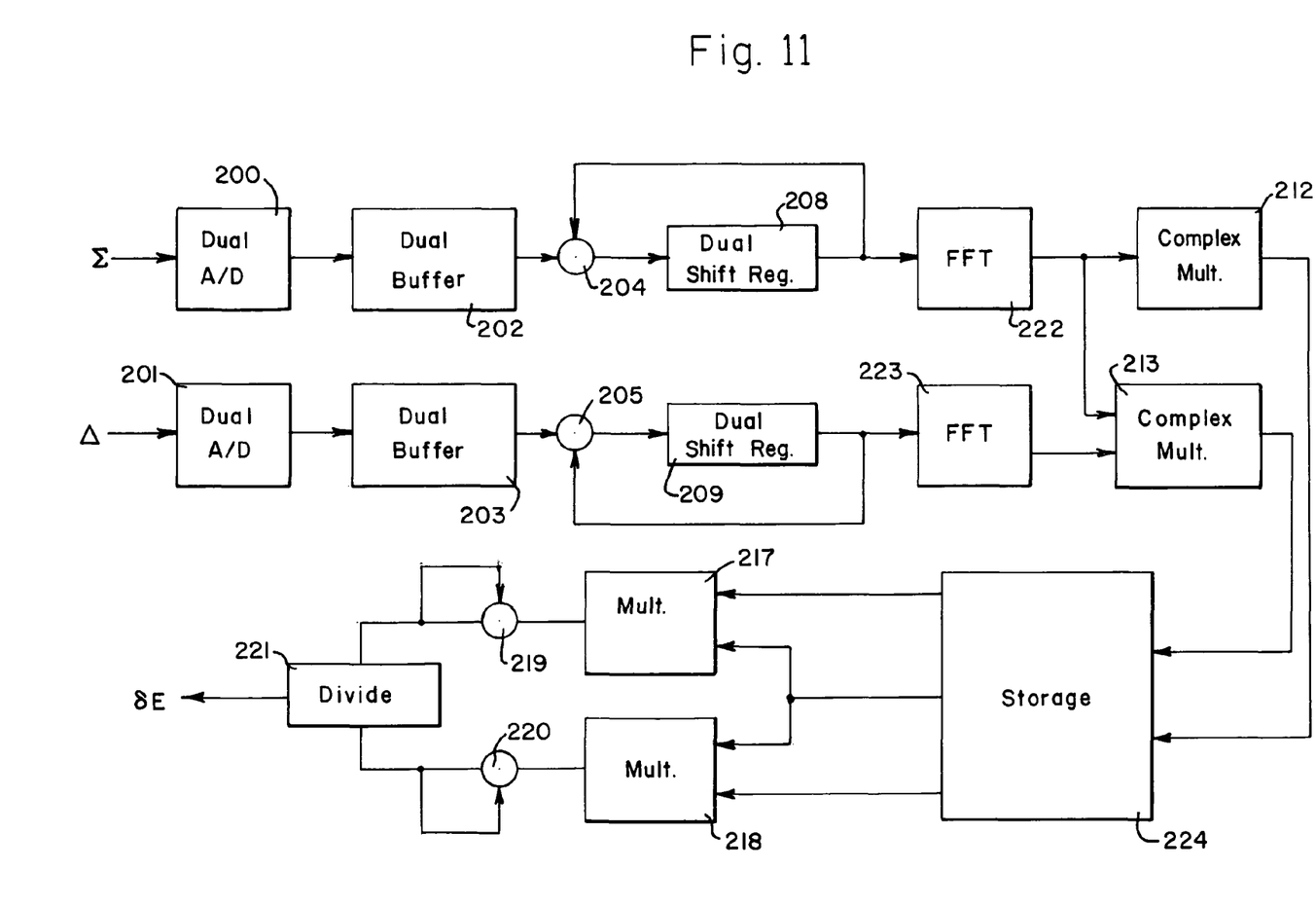
FIG. 11 is a block diagram similar to that of FIG. 9 but illustrating the configuration of an elevation null command generator of a multi-channel type for processing returns from a plurality of azimuth defining frequencies.

In FIG. 11 there is shown a block diagram of a second embodiment of the ENCG 46 which is used where multiple filter channels are utilized as has been described above in connection with FIG. 4. In FIG. 11 elements corresponding by complete analogy to those shown in FIG. 10 bear the same reference character in the 200 series as has been used in the 100 series in FIG. 10. Thus, in FIG. 11 the pair of dual analog-to-digital converters 200 and 201 perform a function analogous to the dual analog-to-digital converters 100 and 101 in FIG. 10. In order to simplify the drawing in FIG. 11, the in-phase and quadrature components are not shown separately. It will be understood, however, that parallel wires are required up to the outputs of the complex multipliers 212 and 213 and that the single wires shown are intended to represent a cable conducting these two components of the signal.

The input process in the embodiment in FIG. 11 is identical to that of the single filter embodiment in FIG. 10 except that the input accumulators pre-sum to the total bandwidth of the entire set of multiple filters. For example, using the same numbers as above but for a 200 foot ground patch consisting of 8 parallel filters each 25 feet wide, again 64 PRF inputs would be pre-summed in the adder 204 plus shift register 208 and adder 205 plus shift register 209 following the two input dual buffers 202 and 203. Eight sequential outputs of these accumulators go to a pair of standard Fast Fourier Transform (FFT) Units 222 and 223 in the sum and difference channels respectively. These Fast Fourier Transform Units may, for example, be of the type described in detail in the Special Issue of the "Transactions of the I.E.E.E." dated June 1967 (Vol. 140-15 #2) on Audio and Electron Acoustics. This entire issue is devoted to Fast Fourier Transform digital filtering.

These units 222 and 223 break the ensemble of range gated signals into N (in this case N=8) narrow band filters. That is to say, the FFT Units 222 and 223 effectively are the plurality of sets of narrow band filters which operate on the range gated video being supplied through the sum and difference channels. The complex products of the resultant 8×16=128 areas are taken in the two complex multipliers 212 and 213 respectively exactly as in the embodiment of FIG. 10. The outputs of the complex multipliers 212 and 213 go to a storage device 224 which holds the two 8×16 matrices of numbers. Sum channel multiplier 217 and difference channel multiplier 218 are connected to receive outputs from the storage device 224 in such a fashion that these outputs are cross multiplied by opposite filter and range gates in the manner discussed above in connection with FIG. 4. That is to say, signal from the area 30 shown in FIG. 4 is multiplied by signal from the area 38, signal from area 32 is multiplied by signal from the area 36, and so forth, in each case the cross product being formed so that the line joining the two areas being multiplied passes through the center area in which the target 15 is located. The resultant products are accumulated in accumulators 219 and 220 and are divided in divider 221 exactly as described for the single filter case and for the same purpose. The output of divider 221 is then again the signal δE which is the elevation pointing error and which is used to position the elevation null plane of the antenna 40 by supplying the signal δE to antenna servo 63. When δE has reduced to zero, the elevation null plane of the antenna will be at the position commanded by signal $R_T$ from generator 51 as may be seen from a consideration of equations 6, 7, and 8 above.

There has thus been provided an elevation null command generator which affords an accurate means of directing the elevation monopulse null of a radar antenna at a target ground defined by range and azimuth signals. The ENCG is immune to bias effects of strong targets off the monopulse null and it will handle a large area of ground so that the error due to signal to noise can be reduced. The division by the square of the sum signals serves to normalize the error signal so that the sensitivity of the system is not affected by variation in the average reflectivity levels of the target area. The net result of these advantages is at least an order of magnitude improvement in the pointing accuracy of the ENCG disclosed herein as compared to prior art devices for controlling the position of the elevation null plane of monopulse radar antennas. This increase in accuracy in turn permits the system to be used for guiding a missile accurately to a fixed target by SARCALM system techniques.

What is claimed is:

1. An elevation null command generator for generating an error signal to servo position the elevation monopulse null plane of an elevated radar antenna at an elevation angle such that said plane intersects a reflecting ground surface at a predetermined command range along a straight line from said antenna to a point of intersection of said elevation null plane with said reflecting ground surface, said generator comprising means for processing the sum and elevation difference channels of a monopulse radar receiver, said processing means including:
   a central range gate, said central gate being centered at said command range;
   a plurality of pairs of range gates, the two gates of each pair being time spaced before and after said center command range of said central range gate; and
   means for cross multiplying the output of the range gates to eliminate the bias effects of strong targets adjacent to the monopulse null plane and ground surface intersection.

2. In an airborne radar system having target selection means, the arrangement comprising:
   a servo controlled monopulse radar antenna for electronically defining a straight boresight line between said antenna and a selected target in response to signals derived from said target selection means;
   means for transmitting signals from said antenna to an area surrounding said selected target and means for receiving return signals from said area and;
   elevation and azimuth null command generators for processing said return signals from said area to servo control said antenna so that the intersection of the azimuth and elevation monopulse null planes thereof lies along the straight line including said antenna and said selected target as a defined by said derived signals from said target selection means, said intersection thus electronically defining said boresight line.

3. The arrangement as recited in claim 2 wherein said target selection mean providing said derived signals defining said selected target comprise a first signal representing the azimuth angle of said selected target with respect to a predetermined reference and a second signal representing the range of said selected target along a straight line from said antenna to said target in the plane of said azimuth angle.

4. The arrangement as recited in claim 3 wherein the means for target selection is said predetermined reference which is the velocity vector of said airborne radar system.

5. Apparatus as in claim 3 wherein said means for processing said range signal comprise:
   a) a central range gate, said central gate being centered at said command range;
   b) a plurality of pairs of range gates, the two gates of each pair being equally time spaced before and after said center command range of said central range gate; and
   c) means for normalizing the output of the equally spaced range gate pairs by cross multiplication of the sum channel outputs times the difference channel outputs for each pair of range gates to eliminate the bias effects of strong targets adjacent to the monopulse null plane and ground surface intersection.

6. Apparatus as in claim 2 and further including means to guide a missile along at least the terminal portion of said straight boresight line beginning at said antenna and terminating at said target.

7. In an airborne system the arrangement comprising:
   signal transmitting and receiving means comprising a transmitter, a receiver, and a monopulse antenna coupled to said transmitter and said receiver for transmitting radar signals to a preselected area and for receiving return signals therefrom;
   means for displaying a map of said area in azimuth-range coordinates,
   means for generating first and second signals respectively representing the azimuth and range coordinates of a target selected from said map display; and
   azimuth and elevation null command generators for respectively utilizing said first and second signals to respectively generate error position signals for controlling the position of said antenna in azimuth and elevation so that said target lies on the line defined by the intersection of the azimuth and elevation monopulse null planes of said antenna.

8. Apparatus as in claim 7 and further including means to guide a missile in said azimuth monopulse null plane and along at least the terminal portion of said line of intersection of said azimuth and elevation null planes to said target.

9. Apparatus as in claim 7 wherein the means for generating the first and second signals providing said azimuth coordinate is an angular coordinate measured with respect to the vector velocity of said airborne system as a zero reference and wherein said range coordinate is provided as range measured along a straight line from said antenna to said target.

10. Apparatus as in claim 7 wherein said map display means is a synthetic array radar display apparatus for servo-positioning the boresight line of an air-to-ground radar on a selected target, including:
    operator actuated means for designating a selected target from said display of said area; and
    antenna servo mechanism responsive to output signals from the azimuth null command generator for comparing a measure of actual azimuth angle of the azimuth plane of the boresight of said beam with a measure of the azimuth angle of said designated target to maintain said boresight azimuth plane on said target by reducing the difference between said angles to zero, said antenna servo mechanism being also responsive to output signals from the elevation null command generator for simultaneously comparing the actual range to said area along said boresight of said beam with the range to said selected target to maintain the elevation plane of said boresight on said target by reducing the difference between said range values to zero.

* * * * *